Figures 1, 2:
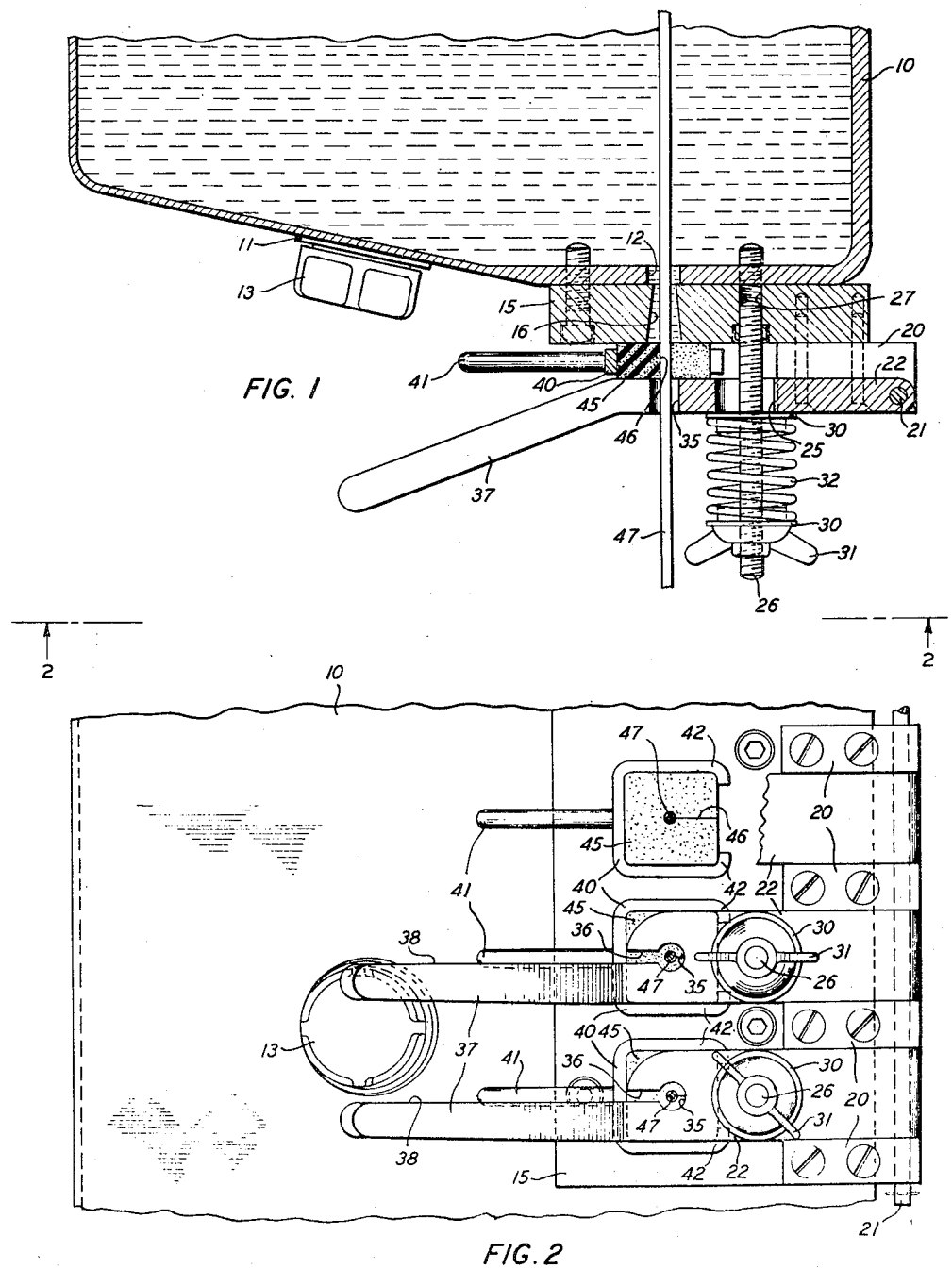

INVENTOR
J. E. LODGE
BY
ATTORNEY

Patented May 9, 1950

2,507,310

UNITED STATES PATENT OFFICE 2,507,310

SEAL FOR STRAND COATING APPARATUS

Joseph E. Lodge, Baltimore, Md., assignor to Western Electric Company, Incorporated, New York, N. Y., a corporation of New York Application February 28, 1945, Serial No. 580,104

11 Claims. (Cl. 286—16)

This invention relates to apparatus for coating strands and has for its object the provision of new and improved apparatus for coating strands.

A strand coating apparatus forming one embodiment of the invention includes a tank having an aperture formed therein. A seal provided for the aperture comprises a resilient block having a slit therein and means serving to secure the block against the tank with the inner end of the slit in alignment with the aperture in the tank and to compress the block around a strand being advanced through the slit and the aperture in the tank.

A complete understanding of the invention may be obtained from the following detailed description of an apparatus forming a specific embodiment thereof, when read in conjunction with the appended drawings, in which Fig. 1 is a fragmentary, vertical section of an apparatus embodying the invention, and Fig. 2 is a fragmentary, bottom plan view of the apparatus taken along line 2—2 of Fig. 1.

Referring now in detail to the drawing, there is shown in Fig. 1 a tank 10 for retaining a coating liquid therein. The tank 10 has an outlet 11 formed therein and a cap 13 is threaded over the outlet to close the outlet. A plurality of apertures, illustrated by an aperture 12, are formed in the tank at spaced points along the bottom thereof.

A plate 15 having a plurality of tapered bores, illustrated by a bore 16, formed therein is secured to the bottom of the tank 10 in a position in which the tapered bores are aligned with the apertures, illustrated by the aperture 12, formed in the tank. A plurality of brackets 20—20 (Figs. 1 and 2) secured to the plate 15 serve to mount a pintle 21. A plurality of arms 22—22 are pivotally mounted on the pintle, and each of the arms 22—22 is inserted between a pair of the brackets, which serve as guides for the arms.

The arms 22—22 have holes, illustrated by a hole 25, formed therein through which bolts 26—26 may pass. The bolts 26—26 are threaded into tapped bores formed in the plate 15, which bores are illustrated by a tapped bore 27 (Fig. 1). A plurality of washers 30—30 and wing nuts 31—31 (Figs. 1 and 2) serve to secure compression springs, illustrated by a compression spring 32, on the bolts 26—26. The compression springs urge the arms 22—22 in a clockwise direction, as viewed in Fig. 1.

The arms 22—22 (Figs. 1 and 2) are provided with a plurality of passages 35—35 and also have slots 36—36 formed therein. Handle-portions 37—37 formed on the ends of the arms 22—22 are bent downwardly, as viewed in Fig. 1, so that the handle-portions do not interfere with the removal of the cap 13 from the outlet 11 when desired. Each of the edges 38—38 (Fig. 2) of the handle-portions form continuances of one of the edges of the slots 36—36.

A plurality of frames 40—40 having handles 41—41 formed thereon include hook-shaped clamping arms 42—42. Each of the frames 40—40 is designed to hold one of a plurality of blocks 45—45 of sponge rubber under compression between the clamping arms 42—42 thereof. The blocks 45—45 have slits 46—46 formed therein with the mouths of the slits positioned between the ends of the clamping arms 42—42. The frames 40—40 carrying the blocks may be positioned between the plate 15 and the arms 22—22 and held in such positions by the action of the arms 22—22, which are pressed against the blocks by the compression springs 32—32.

In the operation of the apparatus described hereinabove, the arms 22—22 are pivoted in a counterclockwise direction, as viewed in Fig. 1, so that the tapered bores, illustrated by the tapered bore 16, are not obstructed by the arms. wires 47—47 are threaded through the tapered bores, illustrated by the bore 16, and the apertures, illustrated by the aperture 12, into the interior of the tank 10. The arms 22—22 then are released and are urged in a clockwise direction by the compression springs, illustrated by the spring 32, whereby the wires 47—47 enter the passages 35—35 through the slots 36—36. The frames 40—40 clamping the blocks 45—45 then are positioned between the arms 22—22 and plate 15 with the wires 47—47 positioned in the slits 46—46. The frames are secured in these positions by the arms 22—22, which are pressed tightly against the blocks by the compression springs 32—32. The frames 40—40 serve to compress the blocks 45—45, which are also compressed by the arms 22—22 pressed thereagainst. Thus, at this time, the blocks serve to contact closely the entire peripheries of the wires 47—47.

The tank 10 then is filled with a coating liquid and the wires 47—47 are drawn upwardly therethrough, as viewed in Fig. 1, whereby the wires are coated. The blocks 45—45 pressed tightly around the wires serve to prevent the coating liquid in the tank 10 from flowing beyond the tapered bores formed in the plate 15. When the wires 47—47 have been drawn completely through the slits 46—46 in blocks 45—45, the slits contract so that the coating liquid cannot leak therethrough. Thus, the blocks 45—45 serve to seal the tapered bores 16—16 formed in the plate 15 at all times.

Th compression of the blocks 45—45 can be varied by adjusting the wing nuts 31—31 on the bolts 26—26 which varies the compression of the compression springs, illustrated by the spring 32. Since the handle portions 37—37 of the arms 32—32 are bent downwardly from the cap 13, the cap may be unthreaded from the outlet 11 without moving the arms 22—22 and without interference therewith by the arms.

The passages 35—35, the tapered bores and the apertures all are somewhat larger in diameter than the wires 47—47 so that oversized portions of the wires will not be contacted thereby during coating operations thereon. However, the blocks 45—45 effectively prevent escape of coating liquid.

The apparatus described hereinabove is simple and inexpensive in construction but is very effective in performing the functions for which it is designed. The blocks 45—45 of sponge rubber serve to seal completely the tapered bores 16—16 formed in the plate 15 and to prevent effectively the escape of any of the coating liquid.

What is claimed is:

1. In a strand coating apparatus including a tank having an aperture formed therein, a seal for the aperture, which comprises a block of sponge rubber having a slit therein, removable means for laterally compressing and mounting the block in a position in which the slit in the block and the aperture are aligned, and a second means for compressing the block axially of the strand being advanced through the slit and the aperture in the tank.

2. In a seal for a coating apparatus, a block of rubber having a slit therethrough the walls of which are normally in contact and through which a strand may be advanced, a member having an aperture therein through which a strand may be advanced, resilient means for clamping the block to the member in a position in which the passageway in the block and the aperture in the member are aligned, and a separate resilient clamping means serving to compress the block, whereby the block is pressed tightly around a strand being advanced through the passageway in the block and the aperture in the member and whereby the block seals the aperture when the strand is removed from the passageway in the block.

3. In a seal for a coating apparatus, a block of sponge rubber having a hole therein, a plate having a passageway formed therethrough, an arm pivotally mounted on the plate and means for pressing the arm toward the plate to secure the block between the plate and the arm.

4. In a seal for a coating apparatus, a block of sponge rubber having a slit therein, a plate having a passageway formed therethrough, an arm having a slotted aperture therein, means for mounting the arm pivotally on the plate, and means for urging the arm toward the plate to clamp the block between the arm and the plate.

5. In a seal for a coating apparatus, a block of resilient material having a slit therein, a member having a passageway therethrough, an arm pivotally mounted on the member and having a slotted aperture formed therein, and a compression spring for urging the arm toward the member to secure the block therebetween.

6. In a seal for a coating apparatus including a tank having an aperture therein, a resilient block having a slit extending from an edge thereof to the central portion thereof, a U-shaped holder for radially compressing the block, said block being positioned in the U-shaped holder so that the outer portion of the slit is adjacent to the mouth of the U, whereby a wire can be slid laterally thereof into the slit of the block within the holder while the block is under radial compression, and means for sealingly securing the block to the tank in a position in which the inner portion of the slit is in alignment with the aperture in the tank.

7. In a seal for a coating apparatus, a block of sponge rubber having a slit extending from an edge thereof to the central portion thereof, a U-shaped holder serving to clamp the block in a position in which the outer portion of the slit in the block is free from the holder, whereby the block can be slid over a wire, a plate having an aperture formed therein, an arm pivotally mounted on the plate and having a slotted hole therein, and a compression spring for pressing the arm toward the plate to secure therebetween the block and the holder.

8. In a seal for coating apparatus including a tank having an aperture formed therein, means for sealing the aperture, which comprises a block of sponge rubber having a slit extending from the outer edge thereof to the central portion thereof, a frame for retaining the block therein under compression, an arm pivotally secured to the tank and having a slotted aperture formed therethrough, and means for urging the arm toward the tank to clamp the block and the frame between the arm and the tank, whereby a strand may be advanced through the slotted aperture in the arm, the slit in the block and the aperture in the tank.

9. In a seal for coating apparatus, a plate having a passageway therethrough, a resilient block having a radial slit extending to an edge of said block and adapted to receive a strand to be coated, said resilient block being movable laterally while abutting said plate, a member abutting the opposite side of said resilient block, resilient means for forcing said member toward said plate to secure the block between the plate and the member under axial compression while maintaining freedom of lateral movement, and means for adjusting the compressive force applied by the resilient forcing means.

10. In a strand coating apparatus including a tank having an aperture formed therein, a seal for the aperture which comprises a removable frame provided with means to receive a strand, a resilient packing block mounted in the frame and radially compressed thereby, said resilient block having a slit adapted laterally to receive a strand to be coated, and resilient compression means for axially urging the resilient block and its frame into sealing relation with the tank.

11. In a strand coating apparatus including a tank having an aperture formed therein, a seal for the aperture which comprises a removable frame provided with means to receive a strand, a resilient packing block mounted in the frame and radially compressed thereby, said resilient block having a slit adapted laterally to receive a strand to be coated, resilient compression means for axially urging the resilient block and its frame into sealing relation with the tank, and means extending from the frame to facilitate removal of the frame.

JOSEPH E. LODGE.

REFERENCES CITED

The following references are of record in the file of this patent:

UNITED STATES PATENTS

| Number | Name | Date |
| --- | --- | --- |
| 1,695,332 | Heeter | Dec. 18, 1928 |
| 2,193,887 | Seeley | Mar. 19, 1940 |
| 2,236,370 | Jackman | Mar. 25, 1941 |
| 2,238,575 | Alexay | Apr. 15, 1941 |